Patented Aug. 18, 1953

2,649,422

UNITED STATES PATENT OFFICE 2,649,422

PHENOLIC ESTER RESINS

David Aelony, Minneapolis, Minn., assignor to General Mills, Inc., a corporation of Delaware No Drawing. Application February 6, 1950, Serial No. 142,709

10 Claims. (Cl. 260—19)

1

The esters of the present invention are derived from phenol formaldehyde resins of a particular type as will be described more fully hereinafter. These resins are esterified with higher unsaturated fatty acids derived from drying oils or semi-drying oils such as linseed and soybean oil acids. The phenol formaldehyde resins themselves may be water-white and crystal-clear, and the ester produced from these resins may be colorless depending upon the color of the fatty acids used for esterification. The esters dry to hard, tough, resilient films, the rate of drying being dependent upon the degree of unsaturation of the fatty acid employed, and the average molecular weight of the resin.

It is therefore an object of the present invention to provide novel esters of phenol formaldehyde resins of a particular type.

It is another object of the present invention to provide higher unsaturated fatty acid esters of phenol formaldehyde resins of a particular type, the esters being in the nature of drying oils and being capable of drying to hard, tough, resilient films.

The phenol formaldehyde resins used for esterification in the present invention are those which contain an average of from about 4 to about 10 phenol groups in the resin molecule and which are derived by the acid catalyzed condensation of from 2 to 2½ moles of formaldehyde per 4 moles of phenol. The resins are preferably substantially free from methylol groups, or at most contain only a few such groups. If there is a substantial number of methylol groups present in the resin, there is a chance for further increase in the molecular weight of the resin through condensation with itself during subsequent esterification. In some instances any substantial condensation occurring during esterification may cause the esterification mixture to gel. Resins which are substantially free from methylol groups may be made by slowly adding formaldehyde to an excess of phenol containing an acid catalyst and then carrying out the usual acid catalyzed condensation. After the condensation is completed, the resin may be cooled under nitrogen, in which event it may be made water-white and crystal-clear.

Resins having an average of from about 4 to about 10 hydroxyl groups per molecule may be made by employing from 2 to about 2½ moles of formaldehyde per 4 moles of phenol. The process is simple and inexpensive to conduct. Any excess phenol may be recovered readily as may be the bis and tris compounds, all of which may be recovered by simply distilling them from the resin reaction mixture. The resins prepared as herein described are insoluble in fatty oils.

The resins may be prepared from phenol itself and may be either of the ortho,ortho- type or of the ortho,para- type, or mixtures of these types of resins. The use of mild acid conditions such as the use of acetic acid as a catalyst, results in essentially ortho, ortho- type of resinification, while strong acids such as hydrochloric and sulfuric, result in a predominance of the ortho,para- type of resinfication. The ortho,ortho- type of resinification is preferred inasmuch as the product which is obtained is linear and has a higher esterification rate. Furthermore it appears to have higher solubility in the usual solvents. The ortho,para- type of resin has a lower esterification rate and a lower solubility, and is therefore generally less desirable.

The resins described above may be esterified with fatty acids of the drying or semi-drying type. These acids may be the mixed acids of a drying or semi-drying oil, such as the mixed acids of soybean oil, linseed oil, tung oil, perilla oil, oiticica oil, and the like. They may likewise be selected fractions of such oils or actually isolated fatty acids of such oils which have a drying or semi-drying characteristic. Even the oleic acid esters dry tack-free in an extended period of time, but generally it is desired to use acids having an iodine number of at least 100 and preferably at least 110.

The esterification may be carried out by simply heating the resins with the fatty acids in the absence of a catalyst at temperatures in excess of 200° C., preferably from 230–250° C., or in the presence of an esterification catalyst at temperatures of from 150–250° C. The water liberated during the reaction may be taken off, condensed, and the reaction carried on until the product has a desired acid number. It has been found that it is usually desirable to carry on the esterification to the point at which a minimum of about 60% of the hydroxyl groups have been esterified. Below this point excess free phenolic hydroxyl groups result in poorer color for the resultant product, and also result in poorer alkali stability. Where the degree of esterification is from 60–70%, the products have a reasonable degree of color and alkali stability and are useful in protective coatings. It is preferred, however, to carry on the esterification to the point at which from 70–100% of the hydroxyl groups are esterified. The products of best color stability and alkali stability are obtained within this range.

The time required for esterification varies widely with the type of resin employed, the extent of esterification desired, and whether or not a catalyst is used. In the absence of a catalyst time periods of from 18–24 hours are required for degrees of esterification of 60% or higher. A time period of from 8–12 hours may be required to esterify an ortho,ortho- resin to about 80% using zinc stearate as a catalyst. The same 80% esterification may be obtained in 6 hours with boric acid anhydride $B_2O_3$. A 60% degree of esterification with boric anhydride on an ortho,ortho-resin may be obtained in about 4 hours. It will thus be seen that, in general, time periods of from 4–24 hours may be employed for the esterification process, depending upon the various conditions which exist.

The following examples will serve to illustrate the invention:

Example 1

Seven hundred fifty-two grams of phenol (8 moles) and 2 g. of concentrated HCl were agitated and heated to 80° C. 364 cc. of formalin (4½ moles) were then added over a period of three hours. Agitation and reflux were continued for five hours, and the product was then first evaporated under a water pump. Thereafter, the residue was distilled at 50μ until the pot temperature reached 310° C. The distillate weighed 128 g. (bis and tris compounds), while the residue weighed 518 g. and had a hydroxyl number of 628, a molecular weight of 512, and a melting point of 98–105° C.

One hundred grams of this phenolformaldehyde resin, 310 g. of soybean oil fatty acids, 4 g. of zinc stearate, and 50 cc. xylene were refluxed and agitated under a Stark and Dean tube for 46 hours at 235–240° C. 90% of the theoretical quantity of water distilled over. The product was first evaporated and then distilled up to 270° C. (pot temperature) at 30μ. The distillate weighed 21 g. and the residue weighed 374 g., had an $n_D^{30}$ 1.5195, an acid number of 6.3, a hydroxyl number of 15.0, a saponification equivalent of 371.5, and a viscosity of $3 \times Z_6$. Two g. of the product were dissolved in 1 g. of xylene and 0.2 cc. of drier. It gave a hard colorless film in ten minutes at 130° C. At room temperature it dried in 30 minutes.

Example 2

One hundred grams of the phenolformaldehyde resin of Example 1, 248 g. of soybean oil fatty acids, 4 g. of zinc stearate, and 50 cc. of xylene were refluxed and agitated under a Stark and Dean tube for 28 hours at 225–240° C. The product was treated as above described, but there was no distillate. The residue weighed 336 g. and had an $n_D^{30}$ 1.5255, an acid number of 5.0, hydroxyl number 53, saponification equivalent 344, and a viscosity $1.14 \times Z_6$.

Example 3

Seven hundred fifty-two grams of phenol (8 moles), 2 g. of concentrated HCl were agitated and heated to 80° C. Then 384 cc. of formalin (4¾ moles) was added over a period of 3 hours. The product was worked up as described in Example 1 to yield a distillate weighing 120 g., and a residue weighing 539 g. and having a hydroxyl number of 624, a molecular weight of 526, and a melting point of 100–109.5° C.

One hundred grams of the above described phenolformaldehyde resin, 308 g. of soybean oil fatty acids, 4 g. of zinc stearate, and 50 cc. xylene were refluxed and agitated under a Stark and Dean tube for 24 hours at 227–245° C. The product was worked up as described in Example 1 to yield a distillate weighing 28 g. and a residue weighing 365 g. and having an $n_D^{30}$ 1.5179, an acid number of 3.8, hydroxyl number of 8.1, saponification equivalent of 341.7, and a viscosity of $Z_4$–$Z_5$. The product when mixed with drier dried to a hard but slightly wrinkled finish in ten minutes at 130° C. At room temperature it dried in 50 minutes to a smooth finish.

Example 4

One hundred grams of the phenol formaldehyde resin of Example 3, 4 g. of zinc stearate, 248 g. of soybean oil fatty acid, and 50 cc. of xylene were agitated and refluxed under a Stark and Dean tube for 22 hours at 230–240° C. The product was treated as above described. There was no distillate, and the residue weighed 335 g., had an $n_D^{30}$ 1.5210, an acid number of 4.8, hydroxyl number of 12.8, saponification equivalent of 345.5, and a viscosity of $2.8 \times Z_6$. Three g. of the product were mixed with 0.3 cc. of drier. A partly frosted hard film formed in ten minutes at 130° C. At room temperature a good film formed in two hours.

Example 5

Seven hundred fifty-two grams of phenol and 2 g. of concentrated HCl were heated to 80° C. Then 405 cc. of formalin (5 moles) was added over a period of three and one-half hours. The product was then treated as described in Example 1, and a distillate weighing 102 g. was obtained. The residue weighed 572 g. and had a molecular weight of 675, a melting point of 101–111° C., and a hydroxyl number of 625.6.

One hundred grams of this resin, 4 g. of zinc stearate, 290 g. of soybean oil fatty acid, and 50 cc. xylene were refluxed and agitated for 47 hours at 230°–250° C. The product was worked up as described above to yield a distillate weighing 13 g. and a residue weighing 353 g. and having an $n_D^{30}$ 1.5197, a hydroxyl number of 24, an acid number of 2.3, and a saponification equivalent of 458. Two g. of the product were dissolved in 2 g. xylene and 0.2 cc. of drier. It dried in ten minutes at 130° C. and in 35 minutes at room temperature.

Example 6

One hundred grams of the phenolformaldehyde resin of Example 5, 4 g. of zinc stearate, 248 g. of soybean oil fatty acids, and 50 cc. of xylene were refluxed and agitated under a Stark and Dean tube for 46 hours at 230–237° C. The product was worked up as described for the other examples. There was no distillate. The residue weighed 332 g. and had an $n_D^{30}$ 1.5215, a hydroxyl number of 16.5, an acid number of 1.8, a saponification equivalent of 350.3, and a viscosity of $Z_5$–$Z_6$. Three g. of the material were mixed with 0.3 cc. of drier. At 130° C. a good film was formed in ten minutes, while at room temperature the film set in 1½ hours.

Example 7

One hundred grams of the phenolformaldehyde resin of Example 3, 3 g. zinc stearate, 290 g. of a fatty acid fraction of tall oil containing approximately 50% of oleic acid, 40% of linoleic acid, and the remainder linolenic acid and rosin acids, were refluxed and agitated together with 50 cc. of xylene under a Stark and Dean tube for 31 hours at 235–270° C. The product was worked up as usual to yield a distillate weighing 9 g. and a residue weighing 365 g., and having an $n_D^{30}$ 1.5175, a hydroxyl number of 3, an acid number of 4.2, and a saponification equivalent of 347.6, and a viscosity of $Z_5$–$Z_6$. Three g. of the product were mixed with 0.3 cc. of drier. The solution formed a nice film in ten minutes at 130° C., and at room temperature dried in two hours.

Example 8

One hundred grams of the phenolformaldehyde resin of Example 5, 4 g. of zinc stearate, 280 g. of the fatty acid fraction of tall oil as described in the previous example, and 50 cc. of xylene were refluxed and agitated under a Stark and Dean tube for 30 hours at 227–235° C. The product was worked up as usual to yield a distillate weighing 9 g. and a residue weighing 358 g., and having an $n_D^{30}$ of 1.5173, a hydroxyl number of 3.3, an acid number of 4.5, a saponification equivalent of 347.7, and a viscosity of Z4. Three grams of the product were mixed with 0.3 cc. of drier. A film formed from this solution dried nicely in ten minutes at 130° C. and in three hours at room temperature.

Example 9

One hundred grams of the phenolformaldehyde resin of Example 1, 4 g. of zinc stearate, 310 g. of linseed oil fatty acid, and 50 cc. xylene, were agitated and refluxed under a Stark and Dean tube for 27 hours at 225–235° C. The product was evaporated, and then stripped at 255° C. at 10μ. The distillate weighed 35 g.; the residue weighed 335 g. (small loss), and had an $n_D^{30}$ 1.5245, an acid number of 6, a hydroxyl number of 37, a saponification equivalent of 375. Two g. of the product were dissolved in 1 g. xylene and mixed with .2 cc. drier. A good film was formed in ten minutes at 130° C. At room temperature it set in 40 minutes.

Example 10

729 cc. formalin (9 moles) were added to a solution of 60 cc. acetic acid in 1504 g. phenol over a period of 65 minutes. The mixture was then refluxed and agitated for 10 hours. Thereafter the mixture was evaporated and stripped to a temperature of 305° C. at 120 microns. The distillate was a liquid weighing 240 g.; the residue weighed 941 g. The Gardner viscosity of a 50% solution of the resin in butanol was J–K. The resin had a molecular weight of 691–736, a capillary melting point of 92–97° C., and a hydroxyl number of 523–524.

100 g. of the above resin, 4 g. zinc stearate, 160 g. distilled mixed soybean oil acids, and 45 cc. xylene were agitated and refluxed under a Stark and Dean tube for 8 hours at a temperature of 235–245° C. 10.4 cc. of water were recovered indicating about 60% esterification.

Example 11

1504 g. of phenol and 4 g. oxalic acid were heated and agitated while 729 cc. formalin (9 moles) were added over a period of 2 hours 45 minutes. Refluxing was continued for 10 hours and the mixture was then allowed to stand overnight. The product was evaporated, then stripped to a temperature of 303° C. at 550 microns. The distillate weighed 247 g.; the residue 1035 g. The residue had a melting point of 93–100° C., molecular weight 767.

100 g. of the above resin, 160 g. distilled mixed soybean oil fatty acids, 4 g. zinc stearate, and 50 cc. of xylene were agitated and refluxed under a Stark and Dean tube for 7 hours during which time 10.3 cc. of water were distilled over, indicating approximately 60% esterification. The product was evaporated to 255 g. The resultant product was made into a 60% solution in mineral spirits, the solution treated with diatomaceous earth and filtered. The filtered solution was mixed with drier and films cast on tubes and plates. The films dried to no transfer in 80 minutes, and were tack free to foil in 8 hours. Rocker hardness after 24 hours was 6, after 4 days 10, acid number 8.6, viscosity 4.4×Z6. The film failed in 5% NaOH in 27 minutes. The product was stable in boiling water after 2 hours, and was stable in cold water after 72 hours.

In the preparation of the resin the number of phenolic groups in the molecule may be varied from 4 to 10. The exact size of the phenolic resin molecule may be governed by the type of acid and the degree of esterification which is to be employed. When a highly unsaturated acid is to be employed for esterification, and when the esterification is to be carried on to a very high degree, there is the possibility of gelation occurring during the esterification when a phenolic resin having 10 phenolic groups is employed. It is preferred, therefore, to employ less rapid drying acids for high molecular weight resins, or to have a reduced degree of esterification. Similarly when phenolic resins having only 4 phenolic groups per molecule are employed, it is preferred to employ more rapid drying acids and to carry the degree of esterification to a higher extent, such that a product which dries within a reasonable period of time and which results in a film of reasonable hardness is obtainable.

Variation is also possible in the removal of the bis and tris compounds. These materials may be left in if desired, but in general they do increase the drying time and result in softer films. In some applications this may not be objectionable and accordingly the bis and tris compounds may be left in entirely. In others it may be desirable to remove the bis and tris compounds to some extent and in other applications it may be desirable to remove the bis and tris compounds completely. The best products are obtained when the bis and tris compounds are removed inasmuch as such products have very rapid drying rates and produce exceedingly hard films.

It will be apparent from the previous description and the numerous examples that there is considerable variation possible in the types of resins and esters which may be prepared. Considerable variation is also possible in the specific type of drying or semi-drying oil acid employed and in the extent of esterification.

On a commercial scale the process may be carried out very simply and easily in a single kettle. The phenol formaldehyde condensation may be carried out in the kettle, after which the excess phenol and also the bis and tris compounds, if desired, may be removed by distillation. The fatty acids and the esterification catalyst, if one is employed, may then be added and the esterification carried on with the simultaneous distillation of the water of reaction. The esterification may be carried on to the desired extent, after which the completed product may be removed from the kettle or may actually be diluted with solvents directly in the kettle to produce a finished solution of the ester.

While various modifications of the invention have been described, it is to be understood that other variations are possible without departing from the spirit thereof.

I claim as my invention:

1. A liquid, low acid number ester of an oil-insoluble phenol formaldehyde resin substantially free from methylol groups, said resin containing an average of from about 4 to about 10 phenolic groups per molecule and being derived from the acid catalyzed condensation of from 2 to 2½ moles of formaldehyde per 4 moles of phenol and being substantially free from phenol and bisphenols, the hydroxyl groups of the resin being esterified at least about 60% by means of an unsaturated higher fatty acid having at least semi-drying characteristics, said ester being substantially free from acetyl groups.

2. A liquid, low acid number ester of an oil-insoluble phenol formaldehyde resin substantially free from methylol groups, said resin containing an average of from about 4 to about 10 phenolic groups per molecule and being derived from the acid catalyzed condensation of from 2 to 2½ moles of formaldehyde per 4 moles of phenol and being substantially free from phenol and bisphenols, the hydroxyl groups of the resin being esterified at least about 60% by means of the mixed acids of soybean oil, said ester being substantially free from acetyl groups.

3. A liquid, low acid number ester of an oil-insoluble phenol formaldehyde resin substantially free from methylol groups, said resin containing an average of from about 4 to about 10 phenolic groups per molecule and being derived from the acid catalyzed condensation of from 2 to 2½ moles of formaldehyde per 4 moles of phenol and being substantially free from phenol and bisphenols, the hydroxyl groups of the resin being esterified at least about 60% by means of the mixed acids of linseed oil, said ester being substantially free from acetyl groups.

4. A liquid, low acid number ester of an oil-insoluble phenol formaldehyde resin substantially free from methylol groups, said resin containing an average of from about 4 to about 10 phenolic groups per molecule and being derived from the acid catalyzed condensation of from 2 to 2½ moles of formaldehyde per 4 moles of phenol and being substantially free from phenol and bisphenols, the hydroxyl groups of the resin being esterified at least about 70% by means of an unsaturated higher fatty acid having at least semi-drying characteristics, said ester being substantially free from acetyl groups.

5. A liquid, low acid number ester of an oil-insoluble phenol formaldehyde resin substantially free from methylol groups, said resin containing an average of from about 4 to about 10 phenolic groups per molecule and being derived from the acid catalyzed condensation of from 2 to 2½ moles of formaldehyde per 4 moles of phenol and being substantially free from phenol and bisphenols, the hydroxyl groups of the resin being esterified at least about 70% by means of the mixed acids of soybean oil, said ester being substantially free from acetyl groups.

6. A liquid, low acid number ester of an oil-insoluble phenol formaldehyde resin substantially free from methylol groups, said resin containing an average of from about 4 to about 10 phenolic groups per molecule and being derived from the acid catalyzed condensation of from 2 to 2½ moles of formaldehyde per 4 moles of phenol and being substantially free from phenol and bisphenols, the hydroxyl groups of the resin being esterified at least about 70% by means of the mixed acids of linseed oil, said ester being substantially free from acetyl groups.

7. A liquid, low acid number ester of an oil-insoluble phenol formaldehyde resin substantially free from methylol groups, said resin containing an average of from about 4 to about 10 phenolic groups per molecule and being derived from the acid catalyzed condensation of from 2 to 2½ moles of formaldehyde per 4 moles of phenol and being substantially free from phenol and bisphenols, the hydroxyl groups of the resin being substantially completely esterified by means of an unsaturated higher fatty acid having at least semi-drying characteristics, said ester being substantially free from acetyl groups.

8. A liquid, low acid number ester of an oil-insoluble phenol formaldehyde resin substantially free from methylol groups, said resin containing an average of from about 4 to about 10 phenolic groups per molecule and being derived from the acid catalyzed condensation of from 2 to 2½ moles of formaldehyde per 4 moles of phenol and being substantially free from phenol and bisphenols, the hydroxyl groups of the resin being substantially completely esterified by means of the mixed acids of soybean oil, said ester being substantially free from acetyl groups.

9. A liquid, low acid number ester of an oil-insoluble phenol formaldehyde resin substantially free from methylol groups, said resin containing an average of from about 4 to about 10 phenolic groups per molecule and being derived from the acid catalyzed condensation from 2 to 2½ moles of formaldehyde per 4 moles of phenol and being substantially free from phenol and bisphenols, the hydroxyl groups of the resin being substantially completely esterified by means of the mixed acids of linseed oil, said ester being substantially free from acetyl groups.

10. Process of producing unsaturated higher fatty acid esters of phenol formaldehyde resins having from 4 to 10 phenolic groups per molecule, which comprises slowly adding formaldehyde to phenol in the ratio of from 2 to 2½ moles of formaldehyde per 4 moles of phenol, condensing the phenol and formaldehyde in the presence of an acid catalyst, evaporating water from the reaction mixture to produce the phenol formaldehyde resin, distilling out phenol and phenol formaldehyde condensation products containing less than 3 phenolic groups per molecule, adding unsaturated fatty acids and an esterification catalyst to the reaction mixture, heating the reaction mixture to an elevated temperature for an extended period of time, removing water formed during the reaction, and continuing the reaction until at least about 60% of the hydroxyl groups of the phenol formaldehyde resin have been esterified with the unsaturated higher fatty acid.

DAVID AELONY.

References Cited in the file of this patent

UNITED STATES PATENTS

| Number | Name | Date |
|---|---|---|
| 1,924,052 | Somerville | Aug. 22, 1933 |
| 2,091,965 | Cherry | Sept. 7, 1937 |
| 2,134,388 | Cherry | Oct. 25, 1938 |
| 2,544,365 | Sorenson | Mar. 6, 1951 |

FOREIGN PATENTS

| Number | Country | Date |
|---|---|---|
| 570,367 | Great Britain | July 4, 1945 |
| 572,822 | Great Britain | Oct. 25, 1945 |